US012675741B2

(12) United States Patent
Lee et al.

(10) Patent No.: US 12,675,741 B2
(45) Date of Patent: Jul. 7, 2026

(54) METHOD AND SYSTEM FOR TRAINING AUTOMATIC DRIVING MODEL

(71) Applicant: HON HAI PRECISION INDUSTRY CO., LTD., New Taipei (TW)

(72) Inventors: Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 146 days.

(21) Appl. No.: 18/638,243

(22) Filed: Apr. 17, 2024

(65) Prior Publication Data

US 2025/0190860 A1 Jun. 12, 2025

(30) Foreign Application Priority Data

Dec. 6, 2023 (CN) .......................... 202311671209.6

(51) Int. Cl.
| | |
|---|---|
| *G06N 20/00* | (2019.01) |
| *B60W 50/00* | (2006.01) |
| *B60W 60/00* | (2020.01) |
| *G07C 5/02* | (2006.01) |

(52) U.S. Cl.
CPC ......... *G06N 20/00* (2019.01); *B60W 50/0098* (2013.01); *B60W 60/0015* (2020.02); *G07C 5/02* (2013.01); *B60W 2556/45* (2020.02)

(58) Field of Classification Search
None
See application file for complete search history.

(56) References Cited

U.S. PATENT DOCUMENTS

| | | | | |
|---|---|---|---|---|
| 11,707,987 | B1 * | 7/2023 | Nair .......................... | B60L 3/12 |
| | | | | 701/22 |
| 2018/0325442 | A1 * | 11/2018 | Lee ........................... | A61B 5/18 |
| 2019/0187707 | A1 * | 6/2019 | Zheng ................... | B60W 40/09 |
| 2019/0291728 | A1 * | 9/2019 | Shalev-Shwartz .... | B60W 40/06 |
| 2020/0070679 | A1 * | 3/2020 | Wang ....................... | B60L 58/21 |
| 2021/0326652 | A1 * | 10/2021 | Hazard .................. | G06N 5/045 |
| 2022/0188695 | A1 * | 6/2022 | Zhu ........................... | G06N 3/08 |

FOREIGN PATENT DOCUMENTS

| | | | | |
|---|---|---|---|---|
| CN | 111242239 | 6/2020 | | |
| CN | 116205024 | 6/2023 | | |
| CN | 113968242 B | * | 10/2023 | .......... B60W 60/001 |

* cited by examiner

*Primary Examiner* — Peter D Nolan
*Assistant Examiner* — Matthew Cobb
(74) *Attorney, Agent, or Firm* — ScienBiziP, P.C.

(57) ABSTRACT

A method for training an automatic driving model comprises: obtaining a sample acquisition strategy of the automatic driving model; transmitting the sample acquisition strategy of the automatic driving model to a vehicle equipment, the vehicle equipment being configured to sort objective driving data from a driving data set based on the sample acquisition strategy; receiving the objective driving data from the vehicle equipment; adding the objective driving data into a training set of the automatic driving model; and training the automatic driving model based on the training set. A system for training the automatic driving model is also disclosed.

11 Claims, 7 Drawing Sheets

10

100

Computer device

Cloud

Establishing of sample acquisition strategy

Analyzing of automatic driving model

Training of automatic driving model

Collecting of driving data

Sorting of objective driving data

Uploading of objective driving data

300

Vehicle equipment

200

501
Driving data of the vehicle in a driving process is collected

502
A sample acquisition strategy of the automatic driving model is received

503
Objective driving data is sorted from the collected driving data based on the sample acquisition strategy of the automatic driving model 504
The objective driving data is transmitted to the computer device

METHOD AND SYSTEM FOR TRAINING AUTOMATIC DRIVING MODEL

TECHNICAL FIELD

The subject matter herein generally relates to training of automatic driving models.

BACKGROUND

In a process of automatic driving model training, vehicles may collect massive amount of data and upload the data to a cloud server. The cloud server can store the uploaded data, and use the uploaded data to train the automatic driving model.

However, data uploaded to the cloud server may consume a lot of bandwidth and hardware/software resources, and in general, the uploaded data for training the automatic driving model may also include a lot of unnecessary data, and the data uploaded by the vehicle may lead to a low training efficiency of the automatic driving model.

BRIEF DESCRIPTION OF THE DRAWINGS

Implementations of the present disclosure will now be described, by way of embodiments, with reference to the attached figures.

DETAILED DESCRIPTION

Figure 1:
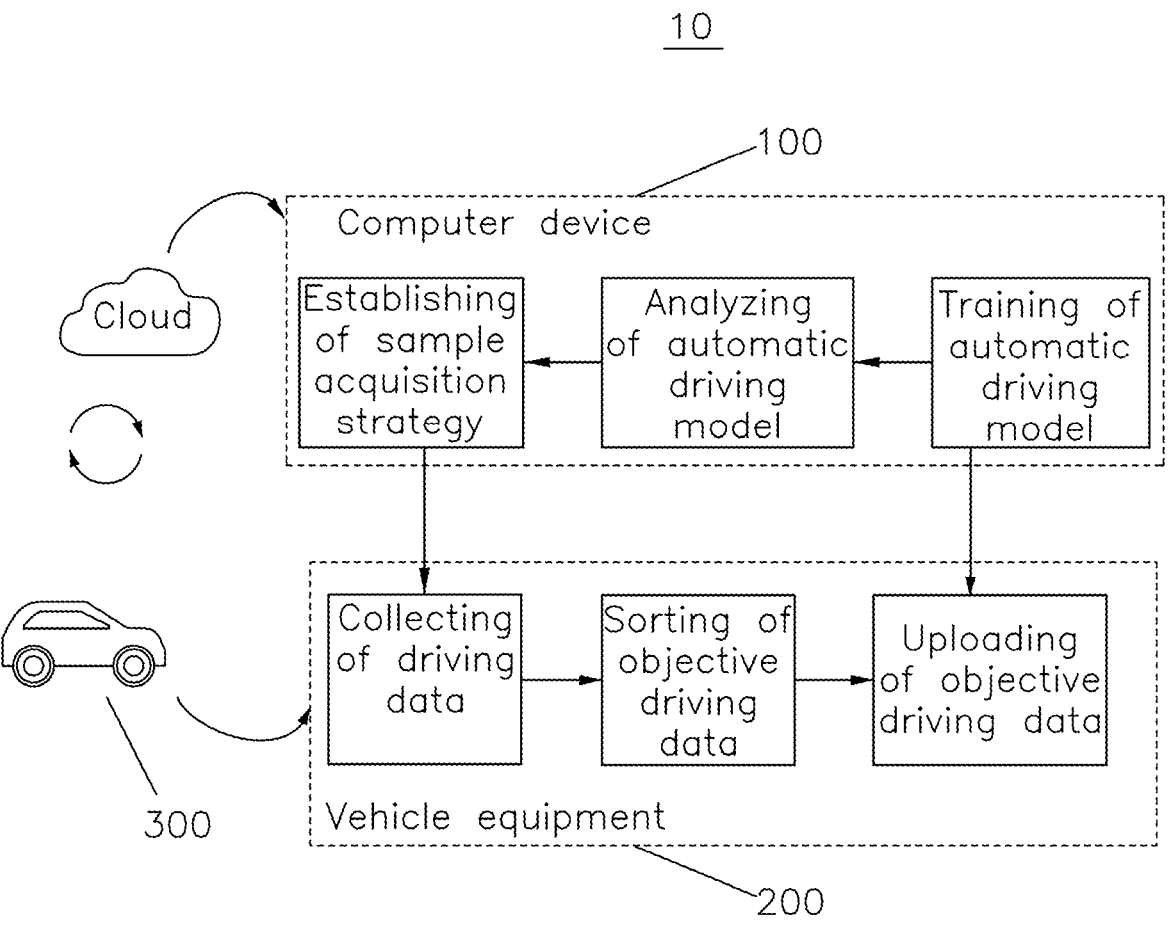
FIG. 1 is a scenario diagram illustrating a system for training an automatic driving model according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

In a field of training an automatic driving model, an amount of data collected by vehicle is very large, cloud servers need to a lot of bandwidth, software/hardware resources to store the collected data, and a cost for training the automatic driving model is high. In addition, the data generated by the vehicles during driving is similar, there is less data that can be used to train the automatic driving model, a training efficiency of the automatic driving model is low if the automatic driving model is trained directly based on the data uploaded by the vehicles. If the cloud servers receive the massive data uploaded by the vehicles, the cloud servers also need to clean and filter the massive data, this process also requires a lot of time and resources.

FIG. 1 illustrates one exemplary embodiment of a system 10 for training an automatic driving model.

The system may include a computer device 100 and a vehicle equipment 200. The vehicle equipment 200 can be integrated in a vehicle 300.

The computer device 100 may be an independent server, a server network, or a server cluster. For example, the computer device 100 includes, but is not limited to, a computer, a network host, a single server, a server set (include a plurality of servers), or a cloud server composed by a plurality of servers. The cloud server may be composed of a large number of computers or network servers based on cloud computing.

The vehicle equipment 200 can be a module in the vehicle 300 with data processing functions. The vehicle equipment 200 may include a processor, a microprogrammed control unit (MCU), an application specific integrated circuit (ASIC), a digital signal processor (DSP), etc. For example, the vehicle equipment 200 may be a central gateway of the vehicle 300.

In one embodiment, the vehicle 300 may further include speed sensors, steering angle sensors, cameras, acceleration sensors, and global position system (GPS) modules, etc.

In one embodiment, the computer device 100 is configured to obtain a sample acquisition strategy of the automatic driving model. The sample acquisition strategy may include a driving scene of objective driving data.

In one embodiment, the driving scene of the objective driving data may be multiple, the sample acquisition strategy may further include a proportion of the objective driving data in each driving scene.

The driving scene is configured to describe various types of scenes of the vehicle 300 during processes of driving, such as road conditions in driving environments, weather conditions, and light conditions in the driving environments.

The road conditions may include uphill, downhill, driving on forks, driving on winding mountain roads, obstacles on road surfaces, and sudden situations on the road surfaces. The sudden situations may include car accidents near the driving path, front collapses, vehicle acceleration in front, vehicle overtaking in rear, etc.

The weather conditions may include driving at hazy days, driving at rainy days, driving at snow days, etc.

The light conditions may include driving at night, driving at daytime, driving at tunnel, etc.

Driving data is configured to describe a driving state of the vehicle 300. For example, the driving data may include a driving scene, a speed, a direction, an acceleration, a position of the vehicle 300, etc.

The objective driving data is driving data generated by the vehicle 300 in driving scenes included in the sample acquisition strategy.

In one embodiment, the computer device 100 is further configured to obtain a vehicle control effect of the automatic driving model in a test driving scene. For example, the computer device 100 may obtain a test sample in the test driving scene, and input the test sample into the automatic driving model, to obtain a vehicle control command corresponding to the test driving scene. The vehicle control command can be used to control the vehicle 300 to turn, acceleration, etc. The vehicle equipment 200 may obtain an execution result of the vehicle control command in the test driving scene, the computer device 100 may detect whether the execution result of the vehicle control command in the test driving scene meets a preset driving safety standard, to obtain the vehicle control effect. If the vehicle control effect of the automatic driving model in the test driving scene does not meet the preset driving safety standard, the test driving scene can be set as the driving scene of the objective driving data.

In one embodiment, the number of the test driving scene can be multiple, the test driving scene can be set according to environmental requirements of automatic driving of the vehicle 300. For example, if the vehicle 300 needs to drive automatically at nighttime, and the test driving scene can include nighttime. If the vehicle 300 needs to pass through intersections, and the test driving scene can include intersections.

The preset driving safety standard can be set according to actual driving requirements, for example, the preset driving safety standard can be an international standard of a new car assessment program (NCAP).

The computer device 100 is configured to transmit the sample acquisition strategy of the automatic driving model to the vehicle equipment 200 after the computer device 100 obtains the sample acquisition strategy.

The vehicle equipment 200 is configured to collect the driving data of the vehicle 300 in a driving process, the driving process can be a driving state of the vehicle 300. For example, when the vehicle 300 is being driven, the vehicle equipment 200 may collect the driving data by a speed sensor, a steering angle sensor, a camera, a gravity sensor, a GPS sensor, etc. The vehicle equipment 200 receives the sample acquisition strategy of the automatic driving model from the computer device 100, sorts the objective driving data from the collected driving data based on the sample acquisition strategy of the automatic driving model. For example, the vehicle equipment 200 may obtain driving scenes of the collected driving data, and sort the objective driving data meeting the sample acquisition strategy from the collected driving data based on the driving scenes of the collected driving data.

In one embodiment, the vehicle equipment 200 may input the collected driving data into a pre-trained scene recognition model to obtain the driving scenes of the collected driving data.

For example, the scene recognition model can be set according to actual driving requirements. The scene recognition model can be a large model, such as ChatGPT, and ChatGPT can determine driving scenes in a time period based on data of the time period.

For example, the driving data is a fragment image, the fragment image is inputted into ChatGPT, and ChatGPT may output a text describing the fragment image as "in an intersection, a light signal is changed from red to green, and the vehicle 300 begins to accelerate", the driving scene of the driving data can be accurately determined based on the text.

After the vehicle equipment 200 sorts the objective driving data, the objective driving data can be transmitted to the computer device 100.

The computer device 100 may add the objective driving data into a training set of the automatic driving model, and train the automatic driving model based on the training set.

In one embodiment, after the computer device 100 trains the automatic driving model based on the training set, the computer device 100 may further obtain the vehicle control effect of the automatic driving model in each of test driving scenes. For example, the number of the test driving scene includes multiple, if a vehicle control effect of the automatic driving model in a first test driving scene of the multiple test driving scenes does not meet the preset driving safety standard, the first test driving scene can be set as the driving scene of the objective driving data, to generate a first sample acquisition strategy corresponding to the first test driving scene. The first sample acquisition strategy can be transmitted to the vehicle equipment 200, the vehicle equipment 200 can sort first objective driving data from the collected driving data based on the first sample acquisition strategy, and transmit the first objective driving data to the computer device 100. The computer device 100 can receive the first objective driving data from the vehicle equipment 200, add the first objective driving data into the training set of the automatic driving model, and retrain the automatic driving model based on the training set or retrain the automatic driving model based on the first objective driving data, until the vehicle control effect of the automatic driving model in each test driving scene meets the preset driving safety standard, so that the automatic driving model can meet the preset driving safety standard in all test driving scenes, and realize a training optimization of the automatic driving model.

Figure 2A:
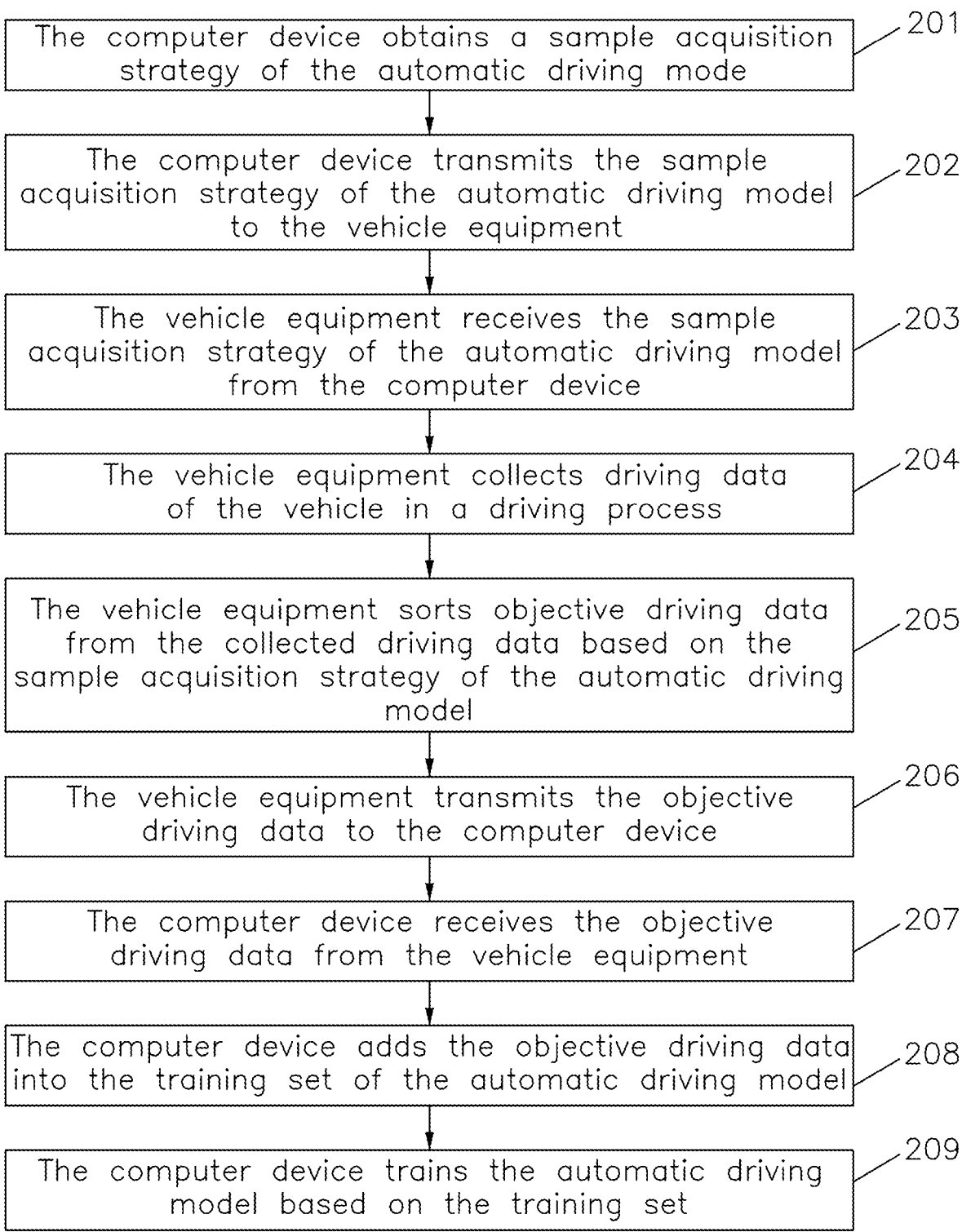
FIG. 2A is a flowchart illustrating a method for training the automatic driving model applied to the system of FIG. 1 according to an embodiment of the present disclosure.

FIG. 2A illustrates one exemplary embodiment of a method for training an automatic driving model. The flowchart presents an exemplary embodiment of the method. The exemplary method is provided by way of example, as there are a variety of ways to carry out the method. Each block shown in FIG. 2A may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 201.

In block 201, the computer device 100 obtains a sample acquisition strategy of the automatic driving mode.

Figure 2B:
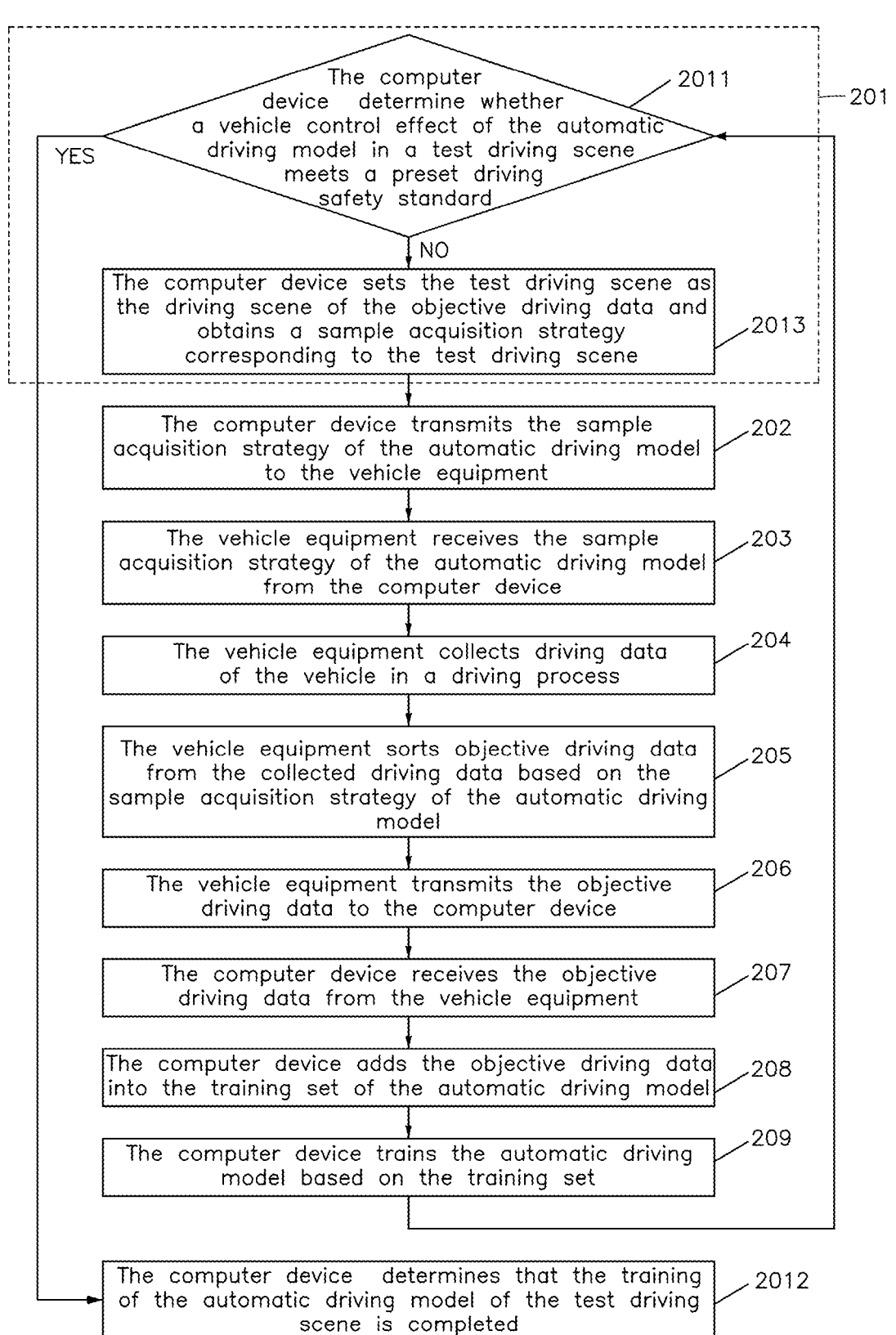
FIG. 2B is a flowchart illustrating a method for training the automatic driving model applied to the system of FIG. 1 according to another embodiment of the present disclosure.

In one embodiment, referring to FIG. 2B, block 201 may further include block 2011 to block 2013.

In block 2011, the computer device 100 determine whether a vehicle control effect of the automatic driving model in a test driving scene meets a preset driving safety standard.

The vehicle control effect is configured to describe whether the vehicle controlled by the automatic driving model meets the preset driving safety standard when driving in the test driving scene.

In one embodiment, the block 2011 may include: the computer device 100 obtains test samples of the test driving scene, inputs the test samples into the automatic driving model to obtain a vehicle control command corresponding to the test driving scene, and detect whether an execution result of the vehicle control command in the test driving scene meets the preset driving safety standard, to obtain the vehicle control effect.

For example, the features of the test driving scene includes: "the vehicle in front overtaking and grabbing the road", "rainy day", and "night". The computer device 100 can take a video clip labeled with "the vehicle in front overtaking and grabbing the road", "rainy day", and "night" as the test samples, input the video clip into the automatic driving model to obtain vehicle control commands. The vehicle control commands can be compared with the driving safety standard (such as NCAP), to obtain the vehicle control effect. For example, the vehicle control effect may be the vehicle control commands of the automatic driving model does not meet the driving safety standard in rainy day and night.

If the vehicle control effect of the automatic driving model in the test driving scene meets the preset driving safety standard, block 2012 can be performed.

In block 2012, the computer device 100 determines that the training of the automatic driving model of the test driving scene is completed.

In one embodiment, if the vehicle control effect of the automatic driving model in the test driving scene meets the preset driving safety standard, the computer device 100 may further obtain a vehicle control effect of the automatic driving model in a next test driving scene.

If the vehicle control effect of the automatic driving model in the test driving scene does not meet the preset driving safety standard, block 2013 can be performed.

In block 2013, the computer device 100 sets the test driving scene as the driving scene of the objective driving data and obtains a sample acquisition strategy corresponding to the test driving scene.

For example, if the vehicle control effects of the automatic driving model in "rainy day" and "night" do not meet the preset driving safety standard, "rainy day" and "night" can be set as the driving scenes of the objective driving data. That is, the sample acquisition strategy can be configured to describe collecting the driving data of the vehicle 300 in "rainy day" and "night".

In one embodiment, the sample acquisition strategy may also include a proportion of the number of objective driving data to be collected in each driving scene.

For example, the proportion of objective driving data of each driving scene can be determined based on the vehicle control effect of each test driving scene. For example, the worse the vehicle control effect in a test driving scene, the higher the proportion of objective driving data in that test driving scene.

In block 202, the computer device 100 transmits the sample acquisition strategy of the automatic driving model to the vehicle equipment 200.

In block 203, the vehicle equipment 200 receives the sample acquisition strategy of the automatic driving model from the computer device 100.

In block 204, the vehicle equipment 200 collects driving data of the vehicle 300 in a driving process.

For example, the vehicle equipment 200 may collect the driving data by a speed sensor, a steering angle sensor, a camera, a gravity sensor, a GPS sensor, etc.

In block 205, the vehicle equipment 200 sorts objective driving data from the collected driving data based on the sample acquisition strategy of the automatic driving model.

In one embodiment, the block 205 may further include: the vehicle equipment 200 obtains driving scenes of the collected driving data, and sorts the objective driving data meeting the sample acquisition strategy from the collected driving data based on the driving scenes of the collected driving data. For example, the vehicle equipment 200 may input the collected driving data into a pre-trained scene recognition model to obtain the driving scenes of the collected driving data.

For example, the scene recognition model can recognize and label the driving scene of the collected driving data. Such as the collected driving data is generated in a driving scene of "night", and the collected driving data can be labeled as "night". The computer device 100 can determine whether the label of each driving data matches with the driving scene included in the sample acquisition strategy. If a label of one driving data matches with the driving scene included in the sample acquisition strategy, the one driving data can be set as the objective driving data; if a label of one driving data does not match with the driving scene included in the sample acquisition strategy, the one driving data can be deleted.

In block 206, the vehicle equipment 200 transmits the objective driving data to the computer device 100.

In one embodiment, the vehicle equipment 200 can manage a upload progress of the objective driving data in a data transmission process, to avoid data loss or slow transmission, and can also deal with problems of data congestion or deadlock, to ensure an integrity of the uploaded objective driving data.

In block 207, the computer device 100 receives the objective driving data from the vehicle equipment 200.

In block 208, the computer device 100 adds the objective driving data into the training set of the automatic driving model.

For example, the collected objective driving data generated during "night" and "rainy day" is added to the training set.

In block 209, the computer device 100 trains the automatic driving model based on the training set.

In one embodiment, after the training of the automatic driving model is completed, the automatic driving model can be deployed in the vehicle 300, the vehicle 300 can operate in an automatic driving mode based on the trained automatic driving model.

In one embodiment, the computer device 100 can fine-tune the automatic driving model and retrain the fine-tuned automatic driving model based on the training set.

In one embodiment, the computer device 100 can fine-tune the automatic driving model and perform block 2011 again, to verify the vehicle control effect of the fine-tuned automatic driving model in each test driving scene.

If the vehicle controlled by the automatic driving model can meet the driving safety standard in each test driving scene, it can be confirmed that the training of the automatic driving model is completed.

If the vehicle controlled by the automatic driving model does not meet the driving safety standard in a test driving scene, the sample acquisition strategy can be adjusted and retrain the automatic driving model, i.e., performs block 2013, and blocks 202 to 209. For example, the sample acquisition strategy can be adjusted based on a substandard test driving scene.

Compared with the vehicle 300 uploading all driving data to the computer device 100, the vehicle 300 in the embodiments uploads the driving data meeting the sample acquisition strategy to the computer device 100, which can reduce the software and hardware resources occupied by the driving data transmission, save the software and hardware resources used by the computer device 100 to store the uploaded driving data, reduce a workload of data cleaning and sorting of the computer device 100, and can also improve a training efficiency of the automatic driving model.

Figure 3:
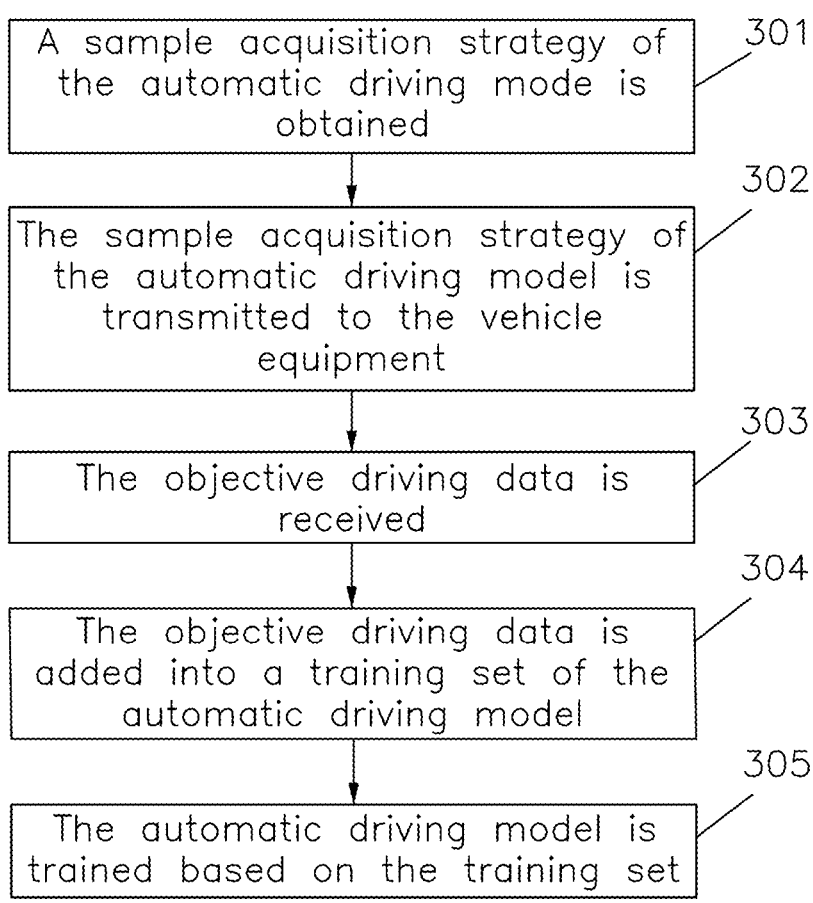
FIG. 3 is a flowchart illustrating a method for training the automatic driving model applied to a computer device according to an embodiment of the present disclosure.

FIG. 3 illustrates one exemplary embodiment of a method for training an automatic driving model. The method can be applied to the computer device 100. The flowchart presents an exemplary embodiment of the method. The exemplary method is provided by way of example, as there are a variety of ways to carry out the method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 301.

In block 301, a sample acquisition strategy of the automatic driving mode is obtained.

Figure 4:
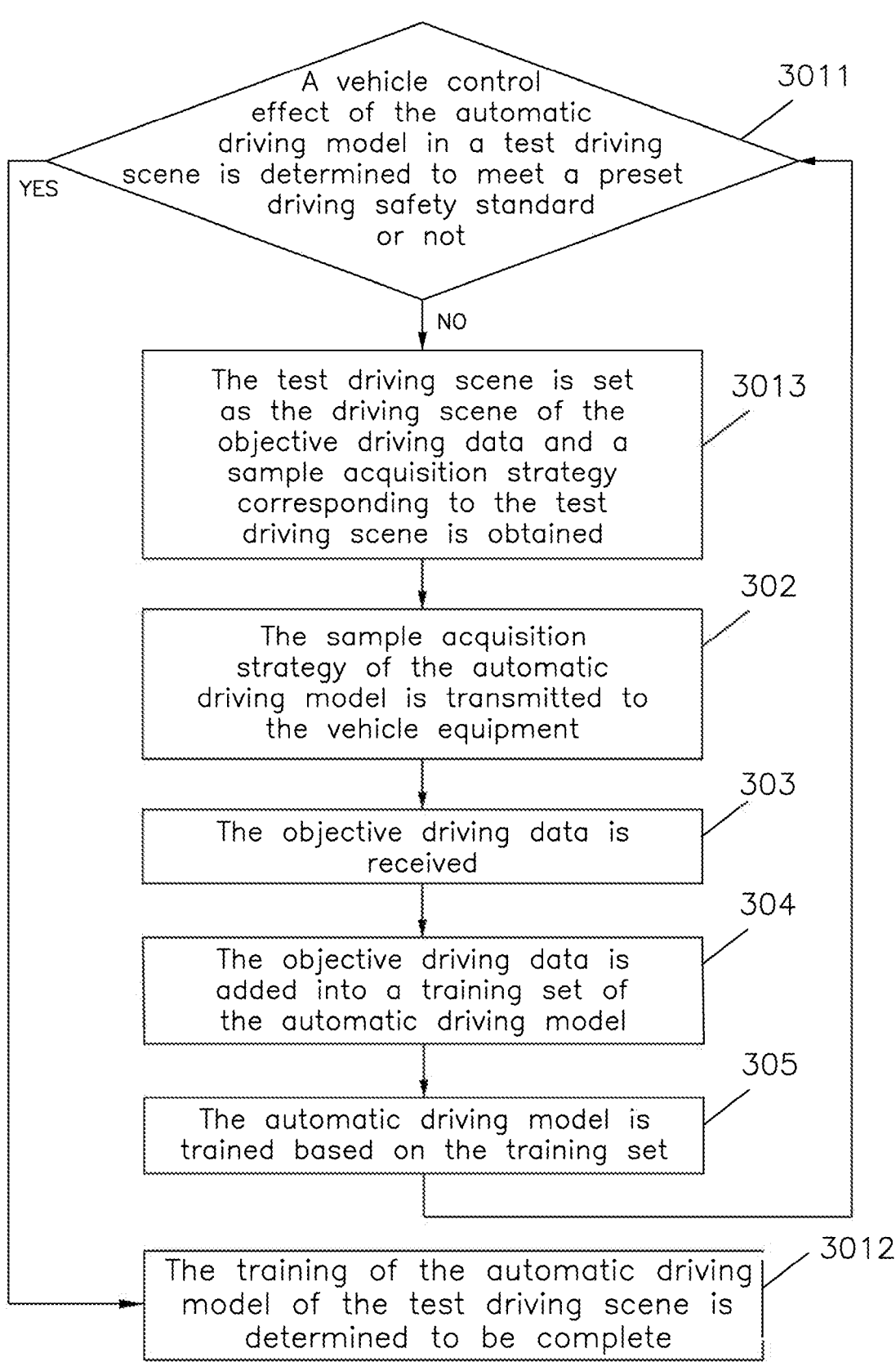
FIG. 4 is a flowchart illustrating a method for training the automatic driving model applied to the computer device according to another embodiment of the present disclosure.

In one embodiment, referring to FIG. 4, block 301 may further include block 3011 to block 3013.

In block 3011, a vehicle control effect of the automatic driving model in a test driving scene is determined to meet a preset driving safety standard or not.

The vehicle control effect is configured to describe whether the vehicle controlled by the automatic driving model meets the preset driving safety standard when driving in the test driving scene.

In one embodiment, the block 3011 may include: obtaining test samples of the test driving scene, inputting the test samples into the automatic driving model to obtain a vehicle control command corresponding to the test driving scene, and detecting whether an execution result of the vehicle control command in the test driving scene meets the preset driving safety standard, to obtain the vehicle control effect.

If the vehicle control effect of the automatic driving model in the test driving scene meets the preset driving safety standard, block 3012 can be performed.

In block 3012, the training of the automatic driving model of the test driving scene is determined to be complete.

If the vehicle control effect of the automatic driving model in the test driving scene does not meet the preset driving safety standard, block 3013 can be performed.

In block 3013, the test driving scene is set as the driving scene of the objective driving data and a sample acquisition strategy corresponding to the test driving scene is obtained.

In block 302, the sample acquisition strategy of the automatic driving model is transmitted to the vehicle equipment 200.

In one embodiment, the vehicle equipment 200 can sort objective driving data from a driving data set based on the sample acquisition strategy of the automatic driving model, the driving data set includes the collected driving data. The vehicle equipment 200 further transmits the objective driving data to the computer device 100. In block 303, the objective driving data is received.

In block 304, the objective driving data is added into a training set of the automatic driving model.

In block 305, the automatic driving model is trained based on the training set.

In one embodiment, after the block 305 is performed, block 3011 can be performed again until the vehicle control effect of the automatic driving model in each test driving scene meets the preset driving safety standard.

Figure 5:
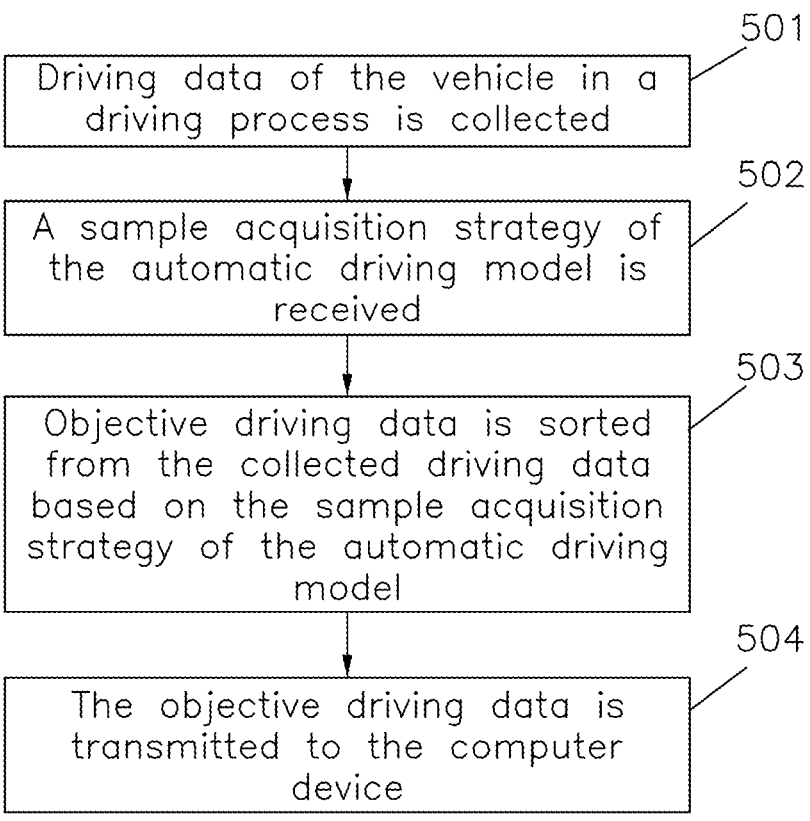
FIG. 5 is a flowchart illustrating a method for training the automatic driving model applied to a vehicle equipment according to an embodiment of the present disclosure.

FIG. 5 illustrates one exemplary embodiment of a method for training an automatic driving model. The method can be applied to the vehicle equipment 200. The flowchart presents an exemplary embodiment of the method. The exemplary method is provided by way of example, as there are a variety of ways to carry out the method. Each block shown in FIG. 5 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 501.

In block 501, driving data of the vehicle 300 in a driving process is collected.

In block 502, a sample acquisition strategy of the automatic driving model is received.

For example, the sample acquisition strategy of the automatic driving model can be received from the computer device 100.

In block 503, objective driving data is sorted from the collected driving data based on the sample acquisition strategy of the automatic driving model.

In one embodiment, the block 503 may further include: obtaining driving scenes of the collected driving data, and sorting the objective driving data meeting the sample acquisition strategy from the collected driving data based on the driving scenes of the collected driving data. For example, the collected driving data is inputted into a pre-trained scene recognition model to obtain the driving scenes of the collected driving data.

In block 504, the objective driving data is transmitted to the computer device 100.

In one embodiment, the computer device 100 can add the objective driving data into a training set of the automatic driving model, and train the automatic driving model based on the training set.

Figure 6:
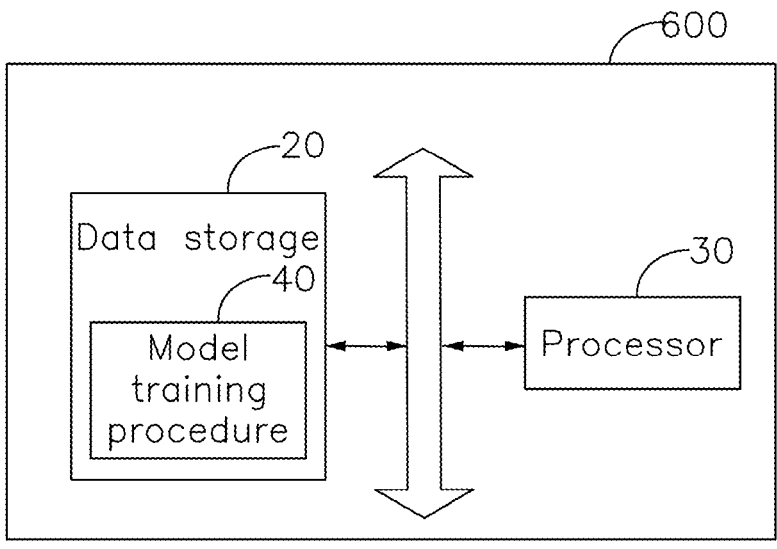
FIG. 6 is a block diagram illustrating an electronic device according to an embodiment of the present disclosure.

Referring to FIG. 6, an electronic device 600 may include at least one data storage 20, at least one processor 30, and a model training procedure 40. The electronic device 600 can be a vehicle equipment or a computer device.

In one embodiment, the data storage 20 can be set in the electronic device 600, or can be a separate external memory card, such as an SM card (Smart Media Card), an SD card (Secure Digital Card), or the like. The data storage 20 can include various types of non-transitory computer-readable storage mediums. For example, the data storage 20 can be an internal storage system, such as a flash memory, a random access memory (RAM) for the temporary storage of information, and/or a read-only memory (ROM) for permanent storage of information. The data storage 20 can also be an external storage system, such as a hard disk, a storage card, or a data storage medium. The processor 30 can be a central processing unit (CPU), a microprocessor, or other data processor chip that achieves the required functions.

In one embodiment, the data transmission procedure 40 may include one or more software programs in the form of computerized codes stored in the data storage 20. The computerized codes can include instructions that can be executed by the processor 30 to implement the above-mentioned of method for training an automatic driving model.

In other embodiments, comparing with FIG. 6, the electronic device 600 can include more or less elements, for example, the electronic device 600 can further include communication elements, buses elements.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method configured for training an automatic driving model applied to a computer device, the computer device comprising a server and enabled to communicate with a vehicle equipment of a vehicle, and the method comprising:
   obtaining a sample acquisition strategy of the automatic driving model;
   transmitting the sample acquisition strategy of the automatic driving model to the vehicle equipment for sorting objective driving data;
   receiving the objective driving data from the vehicle equipment;
   adding the objective driving data into a training set of the automatic driving model;
   training the automatic driving model based on the training set; and
   deploying trained automatic driving model to the vehicle via the server;
   wherein the vehicle operates in an automatic driving mode based on the trained automatic driving model, the sample acquisition strategy comprises a driving scene of the objective driving data, and obtaining the sample acquisition strategy of the automatic driving model further comprises:
   obtaining a vehicle control effect of the automatic driving model in a test driving scene; and
   setting the test driving scene as the driving scene of the objective driving data in a case that the vehicle control effect of the automatic driving model in the test driving scene fails to meet a preset driving safety standard.

2. The method of claim 1, wherein obtaining the vehicle control effect of the automatic driving model in the test driving scene further comprises:
   obtaining test samples of the test driving scene;
   inputting the test samples into the automatic driving model to obtain a vehicle control command corresponding to the test driving scene; and
   detecting whether an execution result of the vehicle control command in the test driving scene meets the preset driving safety standard, to obtain the vehicle control effect.

3. The method of claim 1, wherein after training the automatic driving model based on the training set, the method further comprises:
   continuing to obtain the vehicle control effect of the automatic driving model in the test driving scene until the vehicle control effect of the automatic driving model in the test driving scene meets the preset driving safety standard.

4. A method configured for training an automatic driving model applied to a vehicle equipment of a vehicle enabled to communicate with a computer device, the computer device comprising a server, and the method comprising:
   collecting driving data of the vehicle as the vehicle is in operation;
   receiving a sample acquisition strategy of the automatic driving model from the computer device, wherein the sample acquisition strategy comprises a driving scene of an objective driving data, and the computer device obtains a vehicle control effect of the automatic driving model in a test driving scene, and sets the test driving scene as the driving scene of the objective driving data when the vehicle control effect of the automatic driving model in the test driving scene fails to meet a preset driving safety standard;
   sorting the objective driving data from collected driving data based on the sample acquisition strategy; and
   transmitting the objective driving data to the computer device, wherein the objective driving data is added into a training set of the automatic driving model, and the automatic driving model is trained based on the training set including the objective driving data, trained automatic driving model is deployed to the vehicle via the server, and the vehicle operates in an automatic driving mode based on the trained automatic driving model.

5. The method of claim 4, wherein sorting the objective driving data from the collected driving data based on the sample acquisition strategy further comprises:
   obtaining driving scenes of the collected driving data; and
   sorting the objective driving data meeting the sample acquisition strategy from the collected driving data based on the driving scenes of the collected driving data.

6. The method of claim 5, wherein obtaining the driving scenes of the collected driving data further comprising:
   inputting the collected driving data into a pre-trained scene recognition model to obtain the driving scenes of the collected driving data.

7. A system configured for training an automatic driving model, comprising;
   a vehicle comprising a vehicle equipment; and
   a computer device communicated with the vehicle equipment, the computer device comprising a server;
   wherein the vehicle equipment is configured to:
   collect driving data of the vehicle in a driving process,
   receive a sample acquisition strategy of the automatic driving model from the computer device,
   sort objective driving data from collected driving data based on the sample acquisition strategy, and
   transmit the objective driving data to the computer device;
   the computer device is configured to:
   obtain the sample acquisition strategy of the automatic driving model,
   transmit the sample acquisition strategy of the automatic driving model to the vehicle equipment,
   receive the objective driving data from the vehicle equipment,
   add the objective driving data into a training set of the automatic driving model, and
   train the automatic driving model based on the training set including the objective driving data;

wherein trained automatic driving model is deployed to the vehicle via the server, the vehicle operates in an automatic driving mode based on the trained automatic driving model, the sample acquisition strategy comprises a driving scene of the objective driving data, and when the computer device obtains the sample acquisition strategy of the automatic driving model, the computer device is further configured to:

obtain a vehicle control effect of the automatic driving model in a test driving scene; and set the test driving scene as the driving scene of the objective driving data when the vehicle control effect of the automatic driving model in the test driving scene fails to meet a preset driving safety standard.

8. The system of claim 7, wherein when the computer device obtains the vehicle control effect of the automatic driving model in the test driving scene, the computer device is further configured to:

obtain test samples of the test driving scene;

input the test samples into the automatic driving model to obtain a vehicle control command corresponding to the test driving scene; and detect whether an execution result of the vehicle control command in the test driving scene meets the preset driving safety standard, to obtain the vehicle control effect.

9. The system of claim 7, wherein after the computer device trains the automatic driving model based on the training set, the computer device is further configured to:

continue to obtain the vehicle control effect of the automatic driving model in the test driving scene until the vehicle control effect of the automatic driving model in the test driving scene meets the preset driving safety standard.

10. The system of claim 7, wherein when the vehicle equipment sorts the objective driving data from the collected driving data based on the sample acquisition strategy, the vehicle equipment is further configured to:

obtain driving scenes of the collected driving data; and sort the objective driving data meeting the sample acquisition strategy from the collected driving data based on the driving scenes of the collected driving data.

11. The system of claim 10, wherein when the vehicle equipment obtains the driving scenes of the collected driving data, the vehicle equipment is further configured to:

input the collected driving data into a pre-trained scene recognition model to obtain the driving scenes of the collected driving data.

* * * * *